R. KRULISH.
CRAB TRAP.
APPLICATION FILED OCT. 28, 1915.
1,188,185.
Patented June 20, 1916.
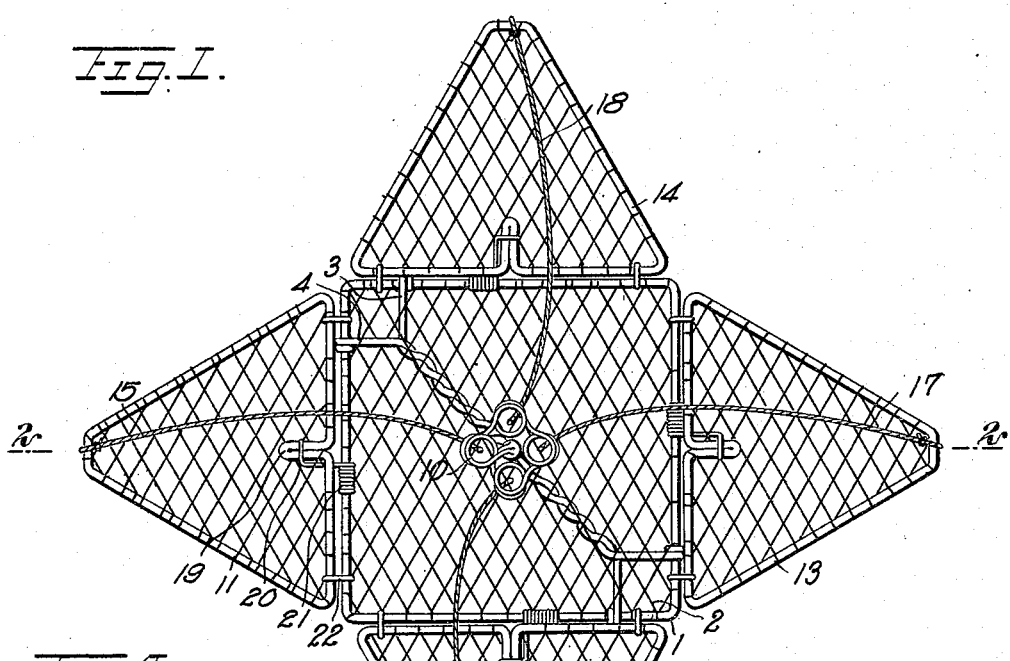
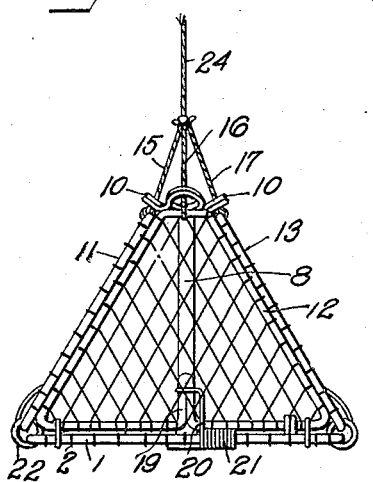
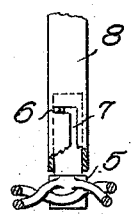
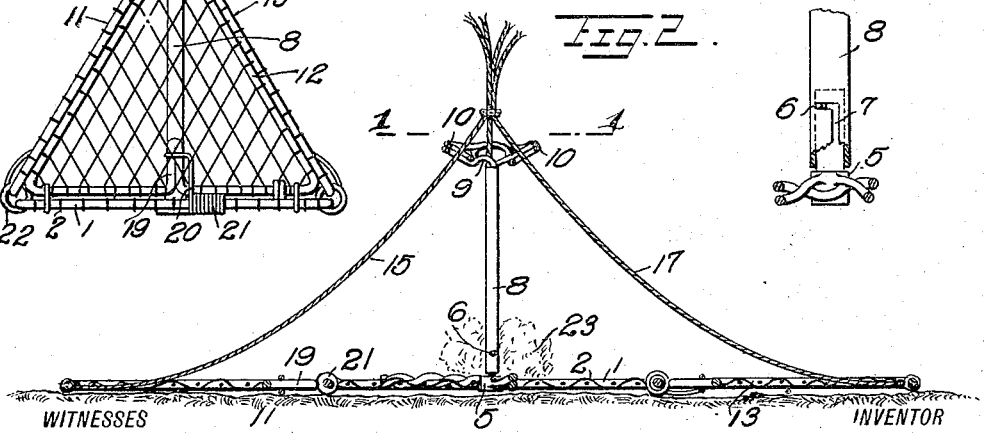
WITNESSES
H. J. Walker
A. L. Kitchin
INVENTOR
Rudolph Krulish
BY
Munn & Co
ATTORNEYS

UNITED STATES PATENT OFFICE.

RUDOLPH KRULISH, OF NEW YORK, N. Y.

CRAB-TRAP.

1,188,185.  Specification of Letters Patent.  Patented June 20, 1916.

Application filed October 28, 1915. Serial No. 58,374.

*To all whom it may concern:*

Be it known that I, RUDOLPH KRULISH, a citizen of the United States, and a resident of the city of New York, borough of Manhattan, in the county and State of New York, have invented a new and Improved Crab-Trap, of which the following is a full, clear, and exact description.

This invention relates to traps and particularly to traps for catching crustacea, as for instance, crabs, lobsters and the like, and has for an object the provision of an improved construction which will quickly and automatically open when a crab rests upon the bottom or other support.

Another object in view is to provide a trap with folding side members and means for folding the side members before the bottom of the trap is raised so that anything in the trap will be prevented from escaping.

A still further object in view is to provide a trap formed with a post for holding the bait in position and acting as a guide for the lifting ropes.

In the accompanying drawing: Figure 1 is a top plan view of the trap in an open or operative position; Fig. 2 is a section through Fig. 1 on line 2—2; Fig. 3 is an enlarged detail fragmentary sectional view of the bottom part of a support embodying certain features of the invention; Fig. 4 is a side view of the trap shown in Fig. 1, the same being disclosed in a folded position.

Referring to the accompanying drawing by numerals, 1 indicates a framework to which a wire mesh 2 is secured in any suitable manner, the framework 1 and mesh 2 forming the bottom for the trap. A pair of wires 3 and 4 are twisted together, as shown in Fig. 1, with the ends spread and secured to frame 1 substantially at right angles to each other to provide for bracing the two wires. The wires 3 and 4 extend diagonally across the frame, though the same might be arranged in some other position without departing from the spirit of the invention.

Positioned substantially centrally of the frame 1 is a post 5 which is secured to the wires 3 and 4 in any suitable manner, as for instance, by being soldered thereto. Post 5 has a pin 6 which is adapted to pass through the bayonet slot 7 in the telescoping post 8. The upper end of the telescoping post has rigidly secured thereto a wire 9 which wire is bent for providing a plurality of eyelets 10, four eyelets being shown by reason of the fact that there are shown four side members, namely side members 11, 12, 13 and 14. The eyelets 10 act as guides for the ropes or cables 15, 16, 17 and 18, which cables pass through the eyelets and are secured to the apex or outer point of the various sides 11 to 14, inclusive.

Each of the side members is constructed from a frame formed of a rod or a comparatively stiff piece of wire, and during the bending thereof a projection or offset 19 is formed in each of the sides. The extension 20 of a spring 21 engages the projection 19 of each of the side members, as clearly shown in Fig. 1, the various springs 21 being wound around on the frame 1 with one end secured thereto so that the opposite end, namely end 20, may act on the various projections 19 for forcing the sides to an open position, as shown in Fig. 1, when the cables 15 to 18 are released. A number of rings 22 connect the various sides with the frame 1 and act as hinges therefor so that the frame may be easily swung from the position shown in Fig. 1 to that shown in Fig. 4 or in a reverse direction as desired.

When using the trap for catching crabs and the like, the telescoping post 8 is removed and the bait 23 is forced over the post 5, as shown in Fig. 2. The adjustable post 8 is then placed in position and the trap is in condition for use. The various cables 15 to 18 may be made from any suitable material and are brought together as shown in Fig. 4 and then the combined strands are secured to a lifting cable 24, which, when the same is moved for raising the trap, will cause the sides to first assume the position shown in Fig. 4 and then if the upward movement is continued the trap will move upwardly. If the parts are in the position shown in Fig. 4 the trap may be lowered in the water and as soon as the same touches the bottom the sides will begin to open and as soon as enough slack cable is provided the sides will be completely open, as shown in Fig. 1. As these sides fold to a central point simultaneously the same will prevent the escape of anything from the trap. It is to be noted that the only stiff member used which extends above a horizontal plane when the trap is in use is the member 8, so that the crabs and other crustacea will not be frightened by striking against stiff guy wires and the like.

What I claim is:

A trap comprising a base provided with a frame and a mesh covering stretched across the frame, a brace for said frame, comprising a pair of wires twisted together with the ends spread apart looped over said frame, the spread part of said brace extending substantially at right angles to each other and to the part of the frame to which it is connected, so as to rigidly hold the brace in position and against twisting or turning, a post connected to said brace substantially centrally thereof and held substantially at right angles to the plane of said base, a plurality of sides hinged to the said base, lifting members connected with said sides, and guiding eyelets in said lifting members connected to the top of said post for guiding said lifting members, whereby as the lifting members are raised the sides will be folded and then the entire trap will be elevated.

In testimony whereof I have signed my name to this specification in the presence of two subscribing witnesses.

RUDOLPH KRULISH.

Witnesses:
 EDWARD THEMAK,
 JOSEF ADAMES.

Copies of this patent may be obtained for five cents each, by addressing the "Commissioner of Patents, Washington, D. C."